June 11, 1929.  W. L. WEINMANN  1,717,132
ELECTRIC BOTTLE WARMER
Filed April 23, 1927
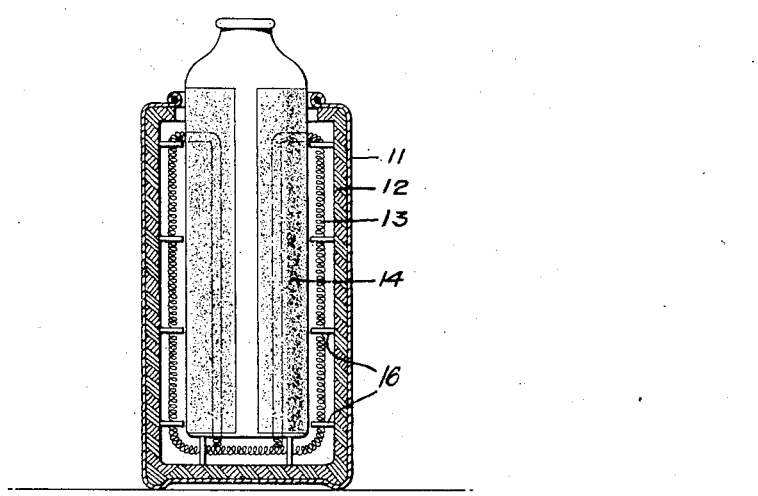
INVENTOR
William L. Weinmann
BY
White, Prost & Fryer
ATTORNEYS Patented June 11, 1929.

1,717,132

UNITED STATES PATENT OFFICE.

WILLIAM L. WEINMANN, OF SAN FRANCISCO, CALIFORNIA.

ELECTRIC BOTTLE WARMER.

Application filed April 23, 1927. Serial No. 186,047.

This invention relates generally to electrical heating appliances and has special reference to electrical devices for heating bottles.

It is an object of this invention to devise an electrical heating appliance which will quickly and efficiently heat bottles containing milk.

It is a further object of this invention to devise an efficient electrical device for heating bottles containing liquids such as milk, without bringing the bottle or its contents into direct contact with the electrical heating elements.

Further objects of this invention will appear from the following description in which I have set forth the preferred embodiment of my invention. It is to be understood that the appended claim is to be accorded a range of equivalents consistent with the state of the prior art.

Referring to the drawing:

The figure is a cross sectional elevational view showing a device constructed in accordance with this invention.

The invention may be outlined generally as comprising means for subjecting the milk contained in a light transmitting bottle to radiant heat while the bottle is being supported in an upright position. The radiant heat is provided by one or more electrical heating elements, which are adjacent to and encompass a major portion of the periphery of the bottle, the heat rays being reflected against the outer surface of the bottle and so transmitted to its contents. In its preferred form the electrical heating elements are kept out of direct conductive contact with the bottle in order to prevent uneven heating or the breakage of the bottle.

In the figure I have shown a heater in which the radiant heating elements are arranged close to the surface of a bottle. In this form of the invention a casing 11 is preferably provided with a heat insulating lining 12, and resistance wires 13 are preferably disposed vertically and spaced about the bottle 14 by means of insulating supports 16. The wires or heating elements are generally adapted to be energized to operate at a glowing temperature. Portions of these wires are also extended across the bottom of the casing so that substantially the entire exterior of the bottle is subjected to direct radiant heat from the glowing wires without bringing the wires in direct contact with the bottle.

It is an important feature of this invention that none of the electrical heating elements come into direct conductive contact with the bottle, as such contact would cause uneven heating and probably breakage of the bottle. Instead of permitting the upper portion of the bottle to project through the device, the bottle may be entirely enclosed and the upper opening closed by a suitable cover. Such features however are incidental to the main idea of this invention, which is to provide a novel electrical heater which will warm a bottle by radiant heat only. The device is of great utility as a domestic appliance since it may be used to heat milk directly in the bottles given to infants. The use of unsanitary immersion heaters is avoided and the bottle need not be heated by a bath of hot water as has been common in the past. As milk is a translucent material it will absorb radiant heat transmitted thru the glass walls of the bottle and will therefore be heated much quicker than a bottle containing a transparent liquid such as pure water.

I claim:

A milk bottle warmer comprising a casing adapted to receive a light transmitting milk containing bottle axially of the same, and radiant electrical heating elements disposed within the casing and adapted to subject the sides of the bottle to radiant heat whereby heat is absorbed by the milk, said elements consisting of a plurality of naked resistance conductors disposed out of direct physical contact with the bottle but arranged adjacent to and so as to encompass a major portion of the periphery of the bottle.

In testimony whereof, I have hereunto set my hand.

WILLIAM L. WEINMANN.